Figure 2:
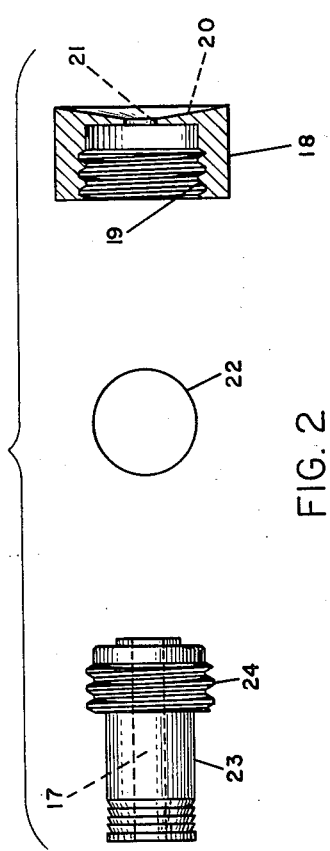

Sept. 3, 1957 L. J. KUHNS 2,805,132
MONITORING OF BORANES
Filed Feb. 25, 1955

Lawrence J. Kuhns
INVENTOR.
BY Donald J. Mosely
his Attorney

United States Patent Office 2,805,132
Patented Sept. 3, 1957

2,805,132

MONITORING OF BORANES

Lawrence J. Kuhns, Harmony, Pa., assignor to Callery Chemical Company, Pittsburgh, Pa., a corporation of Pennsylvania Application February 25, 1955, Serial No. 490,497

6 Claims. (Cl. 23—232)

This invention relates to a new and improved apparatus and method for the detection and analysis of boranes (boron hydrides) in air mixtures. More particularly, it relates to the use of a reagent suitable for gas monitoring devices which is reduced by boranes to produce a distinct color change.

Various reagents and methods have been devised for detecting the presence of toxic gases in air mixtures. Most of these are either not convenient to use or require considerable experience in order to obtain reasonably accurate results. Furthermore, none of the reagents or methods previously developed can be used to detect the presence of small amounts of boranes in the atmosphere in a rapid and efficient manner. Since the boranes are extremely toxic, there is a definite need for a reliable reagent and method which will detect the presence of toxic concentrations of these compounds.

It is an object of this invention to provide a new and improved reagent for detecting the presence of toxic boranes in the atmosphere.

Another object is to provide a new and improved method by which this reagent can be used in gas monitoring devices to detect and measure the amount of boranes present in contaminated air mixtures.

Other objects will become apparent throughout the specification and appended claims which follow.

This new and improved reagent method and apparatus for detecting and analyzing boranes present in the atmosphere will be more fully described hereinafter and the novelty thereof will be particularly pointed out and distinctly claimed.

Volatile boranes such as diborane ($B_2H_6$), tetraborane ($B_4H_{10}$), pentaborane ($B_5H_9$ and $B_5H_{11}$) and decaborane ($B_{10}H_{14}$) will reduce certain tetrazolium salts such as triphenyltetrazolium chloride

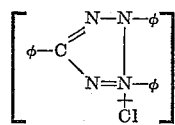

in aqueous alkaline solutions to form colored formazans

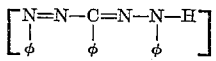

which are insoluble in water. The color change produced can be used to detect small amounts of these volatile boranes in the atmosphere. Since the formazans are insoluble in water, it is necessary to add a solvent miscible with water in order to obtain a uniform solution. When solvents such as dioxane, acetone or the lower alcohols and amines are used the solutions tend to be unstable and must be used immediately. Furthermore, such solutions volatilize rapidly which make them unsatisfactory for use in conventional gas monitoring devices.

This invention is based upon my discovery that aqueous alkaline solutions of certain tetrazolium salts can be made more stable and less volatile by incorporating therein a substantial amount of a high boiling solvent such as quinoline. These solutions can be used in gas monitoring devices to detect the presence of toxic boranes in the atmosphere without excessive evaporation of the solvent.

Reagent compositions containing tetrazolium salts which I have found to be satisfactory were prepared as follows:

| Reagent No. | Quinoline, mls. | TTC,[1] g. | Pyridine, mls. | Borax, g. | Distilled Water, mls. |
|---|---|---|---|---|---|
| 1 | 25 | 0.1 | | | 0.6 |
| 2 | 25 | 0.1 | | 0.03 | 3.0 |
| 3 | 25 | 0.2 | | 0.06 | 4.0 |
| 4 | 25 | 0.4 | 2.0 | 0.12 | 4.0 |
| 5 | 25 | 0.4 | 8.0 | | 4.0 |
| 6 | 25 | 1.0 | 35.0 | | 5.0 |
| 7 | 25 | 0.5 | 2.5 | | 2.5 |

[1] 2,3,5-triphenyl-2,1,3,4-tetrazolium chloride.

A distinct color change was produced with all these reagents when they were treated with a borane. Those reagents containing borax were less stable than the others. The preferred reagent is No. 7 which was capable of detecting 0.5 p. p. m. of pentaborane. Other tetrazolium salts such as blue tetrazolium (3,3[1]-dianisole-bis-4,4[1]-(3, 5-diphenyl)-tetrazolium chloride), neotetrazolium chloride (3,3[1]-(4,4[1]-biphenylene)bis 2,5-diphenyltetrazolium chloride) and neotetrazolium phosphate are also satisfactory indicators when used as reagents in this manner. All the tetrazolium salts are soluble in water but the corresponding formazans are not. Quinoline-water solutions of tetrazolium salts make the formazan formed by reduction of such solutions soluble in the quinoline-water mixture. However, water is not readily soluble in quinoline so that it is necessary to add pyridine to such solutions in order to obtain more easily a homogeneous solution. Pyridine alone is too volatile for use in such solutions so it cannot be used to replace quinoline entirely. A solution of a tetrazolium salt in water, quinoline and pyridine was found to be the most satisfactory reagent of all those tested because such solutions would dissolve a greater amount of tetrazolium salt. The resulting formazan was likewise soluble in this combination and the extremely low volatility desirable in such a reagent was readily obtained.

Figure 1:
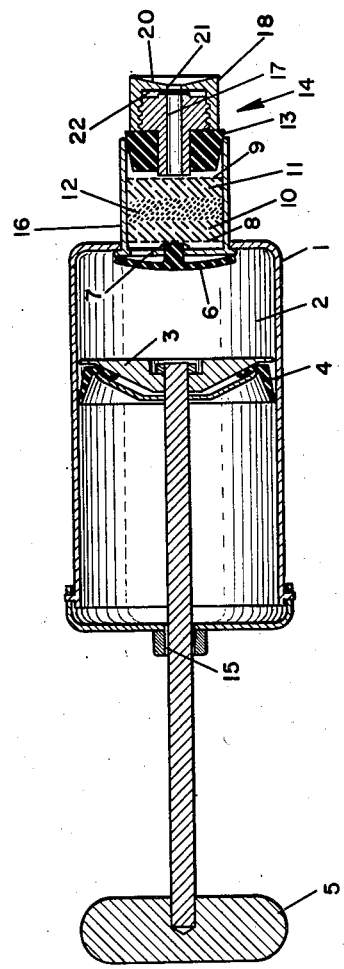

The preferred combination of tetrazolium salt, water, quinoline and pyridine was used as a reagent in a gas monitoring device constructed as shown in the accompanying drawings in which:

Figure 1 is a cross-sectional view of a simple hand operated air sampling device with a sensing unit attached and Figure 2 is an exploded view of the sensing unit used to contain the filter paper impregnated with the indicator reagent.

Having reference now to the drawings, the embodiment shown comprises a casing 1 having an air chamber 2. A sliding plunger 3 is positioned in the chamber 2 and is equipped with an annular rubber check valve 4. The plunger 3 is connected to a handle 5 for movement thereby. The air collected in air chamber 2 is permitted to escape through the exhaust opening 15 around the stem of the plunger 3. At the inlet end of the air chamber 2 there is positioned a rubber check valve 6 controlling an inlet opening 7. Adjacent the opening 7 is a small adsorbing casing 16 provided with two wire screens 8 and 9 which hold in place two layers of glass wool 10 and 11 and a layer of activated carbon 12. To the casing 16 there is attached by means of rubber stopper 13 the sensing unit 14 shown in Fig. 2. The sensing unit 14 consists of a metal body member 23 having an enlarged threaded end portion 24 and a longitudinal passage 17. A threaded cap member 18 is provided with internal threads 19 and fits the end portion 24 of the body member 23. The cap member 18 has an indented end portion 20 with an orifice 21 therethrough. A filter paper 22 saturated with the indicating reagent is held by the cap member 18 against the end of the body member 23.

When in operation this monitoring device works as follows:

The filter paper 22 is saturated with one of the reagent compositions previously described and held in position by the cap member 18. The entire sensing unit shown in Fig. 2 is then connected by means of rubber stopper 13 to the casing 16 shown in Fig. 1. When the plunger 3 is pulled out by means of handle 5, air contaminated with a toxic borane is drawn through orifice 21 and air passage 17, through the filter paper 22, which changes color if the concentration of boranes is great enough to be detected by the sensitivity of the reagent. The color change is observed in the filter paper visible through the orifice 21. The air then continues through the adsorbing casing 16 where the quinoline and pyridine are removed by adsorbent 12 to prevent deterioration of the rubber check valve 6. The check valve 6 opens to allow the air to enter chamber 2 while the plunger check valve 4 remains closed. When the handle 5 is pushed forward check valve 4 opens while check valve 6 closes thus permitting the air to escape through exhaust 15.

The number of strokes (pump displacement of 600 ml. per stroke) of this monitoring device required to produce a definite color change (by comparison with a color standard) of the reagent was calibrated with the concentration of borane present in parts per million of air as follows:

| No. of Strokes | $B_5H_9$ Present in p. p. m. of Air | $B_2H_6$ Present in p. p. m. of Air |
|---|---|---|
| 1 | 10.0 | 100 |
| 2 | 7.0 | |
| 3 | 5.0 | |
| 4 | 3.0 | |
| 5 | 1.0 | |
| 6 | 0.9 | |
| 7 | 0.8 | |
| 8 | 0.7 | |
| 9 | 0.6 | |
| 10 | 0.5 | 10 |

From this calibration chart, it can readily be seen that the reagent and monitoring device used is much more sensitive for detecting pentaborane-9 than for detecting diborane. Obviously, other pumping means for drawing air through the reagent soaked filter paper 22 could be used if desired.

Having thus described and illustrated this invention it should be understood that numerous other modifications are possible and that within the scope of the appended claims this invention may be practiced otherwise than as specifically described.

What I desire to claim and secure by Letters Patent of the United States is:

1. A stable reagent for detecting the presence of toxic boranes in a contaminated atmosphere which comprises a solution of a tetrazolium salt in a ternary homogeneous solution consisting essentially of quinoline, pyridine, and water.

2. A reagent according to claim 1 in which the tetrazolium salt is selected from the class consisting of triphenyltetrazolium chloride, blue tetrazolium, neotetrazolium chloride and neotetrazolium phosphate.

3. A method of detecting the presence of toxic boranes in the atmosphere which comprises passing a mixture of boranes and air through a porous inert carrier impregnated with a reagent which comprises a solution of a tetrazolium salt in a ternary homogeneous solution consisting essentially of quinoline, pyridine and water to produce a distinct color change.

4. A method according to claim 3 in which the tetrazolium salt is selected from the class consisting of triphenyltetrazolium chloride, blue tetrazolium, neotetrazolium chloride and neotetrazolium phosphate.

5. A method according to claim 3 in which the reagent is carried on a filter paper.

6. A method according to claim 5 in which a measured quantity of air is drawn past the filter paper and the borane concentration determined by measuring the volume of air passing the filter paper required to produce a predetermined color change relative to a color standard.

References Cited in the file of this patent

UNITED STATES PATENTS

| | | |
|---|---|---|
| 2,176,462 | McAllister | Oct. 17, 1939 |
| 2,592,585 | MacMasters et al. | Apr. 15, 1952 |
| 2,713,581 | Pannone et al. | July 19, 1955 |

OTHER REFERENCES

Hurd, D. T.: "Chemistry of the Hydrides" (1952), John Wiley & Sons, N. Y., page 84.

Smith: "Science," vol. 113, June 22, 1951, pages 751–754.

Antopol et al.: "Public Health Reports," vol. 63, Sept. 17, 1948, pages 1231–1237.